(12) United States Patent
Katsoulakos et al.

(10) Patent No.: US 11,898,934 B1
(45) Date of Patent: Feb. 13, 2024

(54) INTEGRATION AND TUNING OF PERFORMANCE CONTROL PARAMETERS OF A VESSEL IN ORDER TO MEET DECARBONIZATION GOALS

(71) Applicant: Inlecom Group BV, Brussels (BE)

(72) Inventors: Panayotis Katsoulakos, Haywards Heath (GB); Georgia Kokona Tsiochantari, Athens (GR); Anargyros Mavrakos, Drosia (GR); Antonios Mygiakis, Chalandri (GR); Antonios Antonopoulous, Aghia Paraskevi (GR)

(73) Assignee: Inlecom Group BV, Brussels (BE)

( * ) Notice: Subject to any disclaimer, the term of this patent is extended or adjusted under 35 U.S.C. 154(b) by 0 days.

(21) Appl. No.: 17/954,754

(22) Filed: Sep. 28, 2022

(51) Int. Cl.
*G01M 15/10* (2006.01)
*G05D 1/00* (2006.01)

(52) U.S. Cl.
CPC ........ *G01M 15/102* (2013.01); *G05D 1/0094* (2013.01)

(58) Field of Classification Search
CPC .......................... G01M 15/10; G01M 15/102
See application file for complete search history.

(56) References Cited

U.S. PATENT DOCUMENTS

| 8,346,595 | B2 | 1/2013 | Ben-Hamida |
| 8,935,174 | B2 | 1/2015 | Chn |
| 2008/0294308 | A1 | 11/2008 | Watson |
| 2009/0048726 | A1 | 2/2009 | Lofall |
| 2010/0274367 | A1 | 10/2010 | Kaufman |
| 2011/0184784 | A1 | 7/2011 | Rudow |
| 2012/0167930 | A1* | 7/2012 | Chen ...................... F02M 21/08 134/166 R |
| 2012/0173293 | A1 | 7/2012 | Motley |
| 2012/0247522 | A1* | 10/2012 | Lin ......................... F02M 25/12 134/57 R |
| 2013/0080131 | A1 | 3/2013 | Kaufman |
| 2017/0356359 | A1* | 12/2017 | Glugla ................. F02D 41/0025 |
| 2020/0401743 | A1* | 12/2020 | Bhattacharyya ..... G01C 21/203 |

FOREIGN PATENT DOCUMENTS

| EP | 0215500 B1 | 3/1987 |
| WO | WO-2012005408 A1 | 1/2012 |

* cited by examiner

*Primary Examiner* — Eric S. McCall
(74) *Attorney, Agent, or Firm* — CRGO Global; Steven M. Greenberg

(57) ABSTRACT

Producing and tuning an integrated vessel control model to meet decarbonization goals includes loading an base performance model for a vessel and corresponding observed carbon emissions from the vessel resulting from a set of control inputs for the vessel. A decarbonization model also is selected. A new integrated performance model is computed within a digital twin of the vessel modeling new performance metrics resulting from the deployment of accessories in the decarbonization model, and the new metrics are compared to minimum performance standards for the vessel. When a performance metric fails to meet the minimum standard, a corresponding accessory is identified as impacting the failing performance metric and an adjustment is incrementally applied to the accessory until the failing performance metric is determined to meet the minimum standard. Then, the new integrated performance model is simulated to predict resulting carbon emissions which is stored in the new integrated performance model.

16 Claims, 3 Drawing Sheets

INTEGRATION AND TUNING OF PERFORMANCE CONTROL PARAMETERS OF A VESSEL IN ORDER TO MEET DECARBONIZATION GOALS

BACKGROUND OF THE INVENTION

Field of the Invention

The present invention relates to the technical field of emissions modeling for vessels and more particularly to integrating and tuning performance control parameters of a vessel to meet decarbonization goals reflected in a decarbonization model.

Description of the Related Art

Information and communications technology (ICT) refers to a communication device or application, such as a cellular communications device, radio communications device, satellite communications device or computer data communications device. ICT coupled with an array of sensors and operable to support digitalized modeling in the form of digital twin technology has proven especially promising in the understanding and optimization of vehicles, from satellites, to automobiles and recently, ocean-going vessels. In simple terms, the digital twin of a vessel is a digital replica of the vessel in terms of its structure, equipment and functions. To that end, digital twins use bi-directional, communication links with the ICT systems onboard the vessel to monitor, and predict ship performance and also optimize ship operational performance by activating appropriate actions on the physical object either manually or automatically.

Digital twinning then, is the process, data and platforms used to create a digital twin. A main principle is that there can be one and only one digital twin for every single vessel—no more, no less. The digital twin evolves with its physical counterpart and the two must mirror one another at all times. The communication link from the ship to the digital twin is used to constantly monitor the physical vessel through several data collection techniques and devices. The constant data collection from the sensors on board the vessel allows the digital twin to continuously learn from its physical counterpart, and to evolve throughout the lifecycle of the vessel. As a result, a digital twin can be used to gain insights into the current state of the vessel as well as to predict future states of the vessel through simulation or predictive algorithms. Finally, the digital twin can provide automated supervisory control of the physical ship or inform human decision makers who can perform appropriate tasks.

Notably, it has been proposed to incorporate digitalization in order to better understand emissions generation and opportunities for decarbonization in connection with ocean going vessels. Indeed, it is now a key industry requirement to deploy advanced decision support systems in order to support vessel operators in quantifying the effect of the different decarbonization pathways on the vessel emission profile, as well as the technical and economic performance of the vessel. To that end, optimizing decarbonization pathways can be linked to the measurement of how efficiently a ship transports goods or passengers which measurement is given in terms of the quantity of carbon dioxide emitted by a vessel per cargo-carrying capacity and nautical mile. Each observed vessel is then given an annual rating, whereby the rating thresholds will become increasingly stringent in the future.

The foregoing industrially agreed upon protocol thus incentivize vessel operators to target an acceptable minimum rating. However, with so many possible accessories able to be deployed aboard a vessel in order to reduce carbon emissions, determining the impact upon performance of the vessel of a carbon emissions reducing accessory so as to gauge the feasibility of incorporating the accessory permanently as a carbon emissions reducing agent can amount to tedious trial and error analyses and expensive exercise.

BRIEF SUMMARY OF THE INVENTION

Embodiments of the present invention address technical deficiencies of the art in respect to the holistic modeling of vessel performance resulting from the prospective accessorizing of a vessel in order to meet decarbonization goals for the vessel. A specific ship decarbonization technology can typically have a variable and limited contribution to the ship's environmental performance. However, the combined and optimized use of several decarbonization technologies and operational settings through an integrated real time control system can have synergetic and multiplying effects. To that end, embodiments of the present invention provide for a novel and non-obvious method for integrating and tuning performance control parameters of a vessel to meet decarbonization goals. Embodiments of the present invention also provide for a novel and non-obvious computing device adapted to perform the foregoing method. Finally, embodiments of the present invention provide for a novel and non-obvious data processing system incorporating the foregoing device in order to perform the foregoing method.

In one embodiment of the invention, a method for tuning a vessel control model to meet decarbonization goals include loading from persistent storage into memory of a computing platform, a base performance model for the vessel, according to the class of the vessel, such as bulk carrier, tanker, containership, roll-on/roll-off and the like. This reference performance model is then tuned to specific characteristics of the ship to form the base performance model based on observed performance metrics data of the vessel corresponding to a specified set of control inputs for the vessel, and corresponding observed carbon emissions from the vessel responsive to the specified set of control inputs for the vessel. In this regard, a control input is an operational factor affecting the operation and movement of the vessel. The operational factor can be a manual or automatically configured operational parameter of a control system of the vessel, or an environmental condition including meteorological elements or a contractual or regulatory obligation. Performance metrics are measurements of the performance demonstrated by the vessel during operation and in response to one or more control inputs applied to the vessel.

The method additionally includes selecting a decarbonization model in the persistent storage. The decarbonization model correlates deployment into the vessel of a set of one or more accessories and a reduction in the carbon emissions resulting from use of the set of one or more accessories. Thereafter, a new integrated performance model may be computed for the vessel which can be used to simulate new performance metrics resulting from the deployment of the accessories, taking into account the impact of accessories on existing systems. The new performance metrics may then be compared to a minimum standard of performance metrics for the vessel. On condition that a particular one of the new performance metrics fails to meet the minimum standard of performance metrics, a corresponding one of the accessories in the set is identified as impacting the particular one of the new performance metrics.

As such, an adjustment may be incrementally applied to the identified corresponding one of the accessories that takes into account dependent parameters from the new integrated performance model, until the particular one of the new performance metrics is determined to meet the minimum standard of performance metrics. Finally, the resulting settings may be stored in the new integrated performance model. In this regard, the new performance model can be formed with the physical structure of a knowledge graph so that interdependent aspects of the new integrated performance model can be readily represented. The knowledge graph nodes represent mainly all the control inputs and at the lowest layer sensors, whilst links include the performance metrics and other impact conditions. The top layer nodes are the minimum performance standard controls, the voyage performance optimization and cargo management controls that are linked to nodes for propulsion performance controls, electrical power performance controls, and decarbonisation accessories controls. By querying the knowledge graph the ship operating settings are returned for attaining a performance standard.

In one aspect of the embodiment, the observed performance metrics and the new performance metrics each include at least fuel consumption, emissions including industry accepted metrics such as CO2 g/ton-mile and carbon intensity index (CCI) plus efficiency for hull, machinery and energy system elements of the vessel, operating atmospheric conditions and operating sea conditions and performance metrics associated with contractual and regulatory obligations.

In another aspect of the embodiment, the specified set of the control inputs include at least vessel speed, draft and trim, propulsion system settings, cargo controls and electric power configuration, and decarbonization accessories capacities and other performance metrics. In yet another aspect of the embodiment, the base performance model is loaded based upon a common classification for the vessel including type of the vessel, vessel capacity, vessel propulsion system characterization and vessel engine configuration. Finally, in even yet another aspect of the embodiment, the vessel base model may be fine-tuned with real time vessel operation data during the initial deployment of the solution in a specific vessel and updated with real time performance metrics received from over a computer communications network from different at sea vessels reporting real time values for the benchmarking of decarbonization accessories.

In another embodiment of the invention, a data processing system is adapted for tuning a vessel control model to meet decarbonization goals. The system includes a host computing platform with one or more computers, each with memory and one or processing units including one or more processing cores. The system also includes network interface circuitry disposed in at least one of the computers and providing, to programmatic modules executing in the host computing platform, data communications services to other computing devices from over a data communications network. The system yet further includes persistent storage coupled to the host computing platform. The persistent storage stores a set of decarbonization models, each correlating deployment into a vessel of a set of one or more accessories and a reduction in carbon emissions resulting from use of the set of one or more accessories. The persistent storage also stores the base performance model for the vessel and associated performance metrics of the vessel corresponding to a specified set of control inputs for the vessel and observed ones of the carbon emissions from the vessel responsive to the specified set of control inputs for the vessel.

Finally, the system includes a tuning module. The tuning module includes computer program instructions enabled while executing in the memory of at least one of the processing units of the host computing platform to tune a vessel control model in order to meet decarbonization goals. Specifically, the instructions load the base performance model for the vessel from the persistent storage into the memory of the host computing platform and select one of the decarbonization models in the persistent storage. The instructions then compute a new integrated performance model and associated knowledge graph for the vessel, returning new performance metrics resulting from the deployment of the one or more accessories of the selected one of the decarbonization models and compare the new performance metrics to a minimum standard of performance metrics for the vessel.

On condition that one of the new performance metrics fails to meet the minimum standard of performance metrics, the instructions identify a corresponding one of the accessories in the set impacting the one of the new performance metrics, incrementally apply an adjustment to the identified corresponding one of the accessories until the one of the new performance metrics is determined taking into account dependent parameters from the integrated performance model to meet the minimum standard of performance metrics, simulate the new integrated performance model in order to predict resulting carbon emissions and store the resulting settings in the new performance knowledge graph.

In this way, the technical deficiencies of the trial and error determination of the beneficial or deleterious effect of the deployment of a carbon reducing accessory onboard a vessel are overcome owing to the incremental tuning of the accessory determined to have imparted a deleterious impact upon the modeled performance of the vessel in a digital twin of the vessel which can then be stored as a proper decarbonization model for the vessel. Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for an integrated vessel control model and tuning method in order to meet decarbonization goals. In accordance with an embodiment of the invention, a digital twin may be generated for a vessel, using a digital twining platform, modeling the performance of the vessel under various control inputs by way of received sensor data collected on board the vessel and transmitted to the digital twin. Included amongst the sensor data is direct emissions measurements or measurements enabling their calculation. The base performance model is then created for the vessel encapsulating the sensed data and the control inputs established for the vessel in respect to the sensed data. In parallel, a decarbonization model defining one or more accessories to the vessel may be included in the digital twin so that a new integrated performance model may be generated through a simulation of the digital twin in light of carbon emissions reductions occurring responsive to the accessories.

Performance metrics modeled in the digital twin are then collected and compared to minimum performance standards for the vessel. To the extent that one or more of the collected performance metrics of the new performance model fail to meet the minimum performance standards, one or more of the accessories correlated to those of the collected performance metrics which fail the minimum standards are repeatedly tuned during simulation of the digital twin so that new performance metrics may be collected resulting from each simulation and compared to the minimum performance standards for the vessel. The process of tuning continues until all performance metrics collected from the most recent simulation of the digital twin meet or exceed the minimum performance standards. Thereafter, the new integrated performance model including the accessories as part of the controls may be persisted in connection with the vessel and applied to the vessel itself for carbon emissions reduction.

Figure 1:
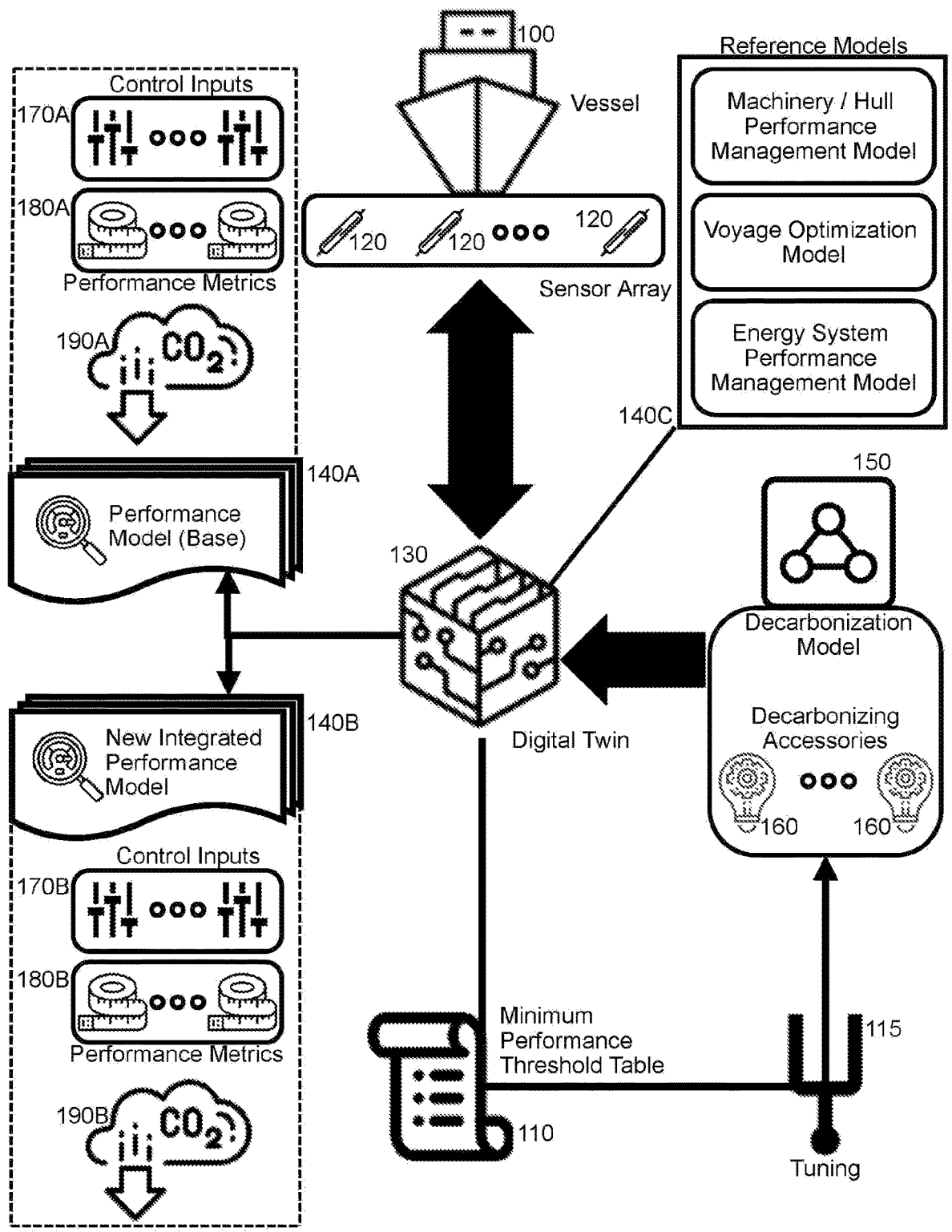
FIG. 1 is a pictorial illustration reflecting different aspects of a process of tuning a vessel control model to meet decarbonization goals.

In illustration of one aspect of the embodiment, FIG. 1 pictorially shows a process of tuning a vessel control model to meet decarbonization goals. As shown in FIG. 1, a sensor array or sensors 120 supplies performance data for a vessel 100, representing a specific vessel class, to a digital twin 130 permitting subsequent modeling by the digital twin 130 of the base performance model of vessel 100, utilizing a set of reference models 140C including a reference model of machinery and hull performance management, a reference model of voyage optimization, and one or more reference models of decarbonization accessories.

The base performance model can be used to predict the performance of the vessel 100 responsive to different arrangements of control inputs for the vessel 100 and different arrangements of accessories applied to the vessel 100. To that end, the base performance model 140A for the vessel 100 can be retrieved for processing, including one or more control inputs 170A applied to the vessel 100, different performance metrics 180A measured for the vessel 100 in response to the control inputs 170A, and observed emissions 190A by the vessel 100 resulting from the control inputs 170A.

In this regard, the control inputs 170A may include the configured speed of the vessel 100, the experienced load of the vessel 100, engine power applied to the vessel 100, a number of engines placed online on the vessel 100, a number of engines engaged by the vessel 100, operating atmospheric conditions and operating sea conditions experienced by the vessel 100 while underway. Likewise, the performance metrics 180A may include fuel consumption by the vessel 100, an observed speed of the vessel 100, the experienced trim of the vessel 100, ballast required by the vessel 100 and the draught demonstrated by the vessel 100. Optionally, the base performance model 140A can be retrieved in connection with the vessel 100 specifically, or in connection with a common classification for the vessel 100 including, for instance a type of the vessel 100, a geometry of the vessel 100, a propulsion system characterization of the vessel 100 or an engine configuration of the vessel 100. As a further option, the existing performance model 140A can be updated through the digital twin 130 with real time performance metrics received from over a computer communications network from different at sea vessels of similar type to the vessel 100, the at sea vessels reporting real time values for the control inputs 170A, for the performance metrics 180A and for the observed carbon emissions 190A.

A decarbonization model 150 is then selected for application to the digital twin 130. In this regard, the decarbonization model 150 includes a collection of one or more modeled accessories 160 to the vessel 100. Specifically, the accessories 160 each may include computer controlled on-board energy/fuel storage and conversion technologies that can contribute towards reduced-emissions targets including decarbonized fuels (H2, NH3, methanol, synthetic fuels); electricity production and conversion; a mechanical device to assist propulsion and/or promote the hydrodynamics of the vessel 100, a computing device operable to optimize the operation of the engines or propulsion system of the vessel 100 so as to reduce carbon emissions produced by the engines, a computing device operable to moderate power utilization onboard the vessel 100 according to prioritized appliances requiring power, one or more filters/carbon capture devices applied to the engines or propulsion system of the vessel 100 operable to reduce carbon emissions, or other such devices computational, mechanical or otherwise, configured to reduce carbon emissions produced by the vessel.

Of note, each of the accessories 160 modeled in the decarbonization model 150 includes one or more definitions implicating an impact or constraint on the performance of one or more elements of the vessel 100, and one or more configuration parameters affecting both the degree to which a corresponding one of the accessories 160 is enabled to reduce carbon emissions, and also a degree to which a corresponding one of the accessories 160 impacts the performance of the one or more elements of the vessel 100. In this way, when applied to the digital twin 130, an impact of the presence and configuration of each one of the accessories 160 can be measured upon the performance metrics 180B of a new Integrated Performance model 140B for the vessel 100 in light of the control inputs 170B proposed to be applied to the vessel as part of the new performance model 140B predicted by the digital twin 130. As well, the digital twin 130 may predict the carbon emissions 190B expected to be observed by the vessel 100 in light of the control inputs 170B and the accessories 160 of the decarbonization model 150.

A decarbonization model 150 is then selected for application to the digital twin 130. The decarbonization model 150 includes a collection of one or more modeled accessories 160 to the vessel 100. Specifically, the accessories 160 each may include computer controlled on-board energy/fuel storage and conversion devices that contribute towards reduced-emissions targets including decarbonized fuels (H2, NH3, methanol, synthetic fuels); electricity production and conversion; a mechanical device to assist propulsion and/or promote the hydrodynamics of the vessel 100, a computing device operable to optimize the operation of the engines or propulsion system of the vessel 100 so as to reduce carbon emissions produced by the engines, a computing device operable to moderate power utilization onboard the vessel 100 according to prioritized appliances requiring power, one or more filters/carbon capture devices applied to the engines or propulsion system of the vessel 100 operable to reduce carbon emissions, or other such devices computational, mechanical or otherwise, configured to reduce carbon emissions produced by the vessel.

Of note, each of the accessories 160 modeled in the decarbonization model 150 includes one or more definitions implicating an impact or constraint on the performance of one or more elements of the vessel 100, and one or more configuration parameters affecting both the degree to which a corresponding one of the accessories 160 is enabled to reduce carbon emissions, and also a degree to which a corresponding one of the accessories 160 impacts the performance of the one or more elements of the vessel 100. In this way, when applied to the digital twin 130, an impact of the presence and configuration of each one of the accessories 160 can be measured upon the performance metrics 180B of a new integrated performance model 140B for the vessel 100 in light of the control inputs 170B proposed to be applied to the vessel as part of the new performance model 140B predicted by the digital twin 130. As well, the digital twin 130 may predict the carbon emissions 190B expected to be observed by the vessel 100 in light of the control inputs 170B and the accessories 160 of the decarbonization model 150.

To that end, once the decarbonization model 150 has been applied to the digital twin 130 in order to produce the new performance model 140B, the performance metrics 180B of the new integrated performance model 140B can be compared to minimum performance standards for the vessel 100 present in a table of minimum performance thresholds 110 for each type of the performance metrics 180B. To the extent that a particular one of the performance metrics 180B falls short of a corresponding minimum performance threshold defined in the table 110, each corresponding one of the accessories 160 determined to impact a portion of the vessel 100 contributing to the particular one of the performance metrics 180B can be subjected to incremental tuning 115 of the configuration of each corresponding one of the accessories 160.

With each incremental adjustment of the configuration of the corresponding one of the accessories 160, it can be determined if the particular one of the performance metrics 180B continues to fall short of the corresponding minimum performance threshold defined in the table 110. Once the performance metrics 180B are simulated in the digital twin 130 to meet the minimum performance standards of the table 110, the new performance model 140 can be persisted including the decarbonization model 150 in connection with the vessel 100 and for subsequent real-world application to the vessel 100 in order to promote a reduction in carbon emissions produced by the vessel 100 in actual operation.

Figure 2:
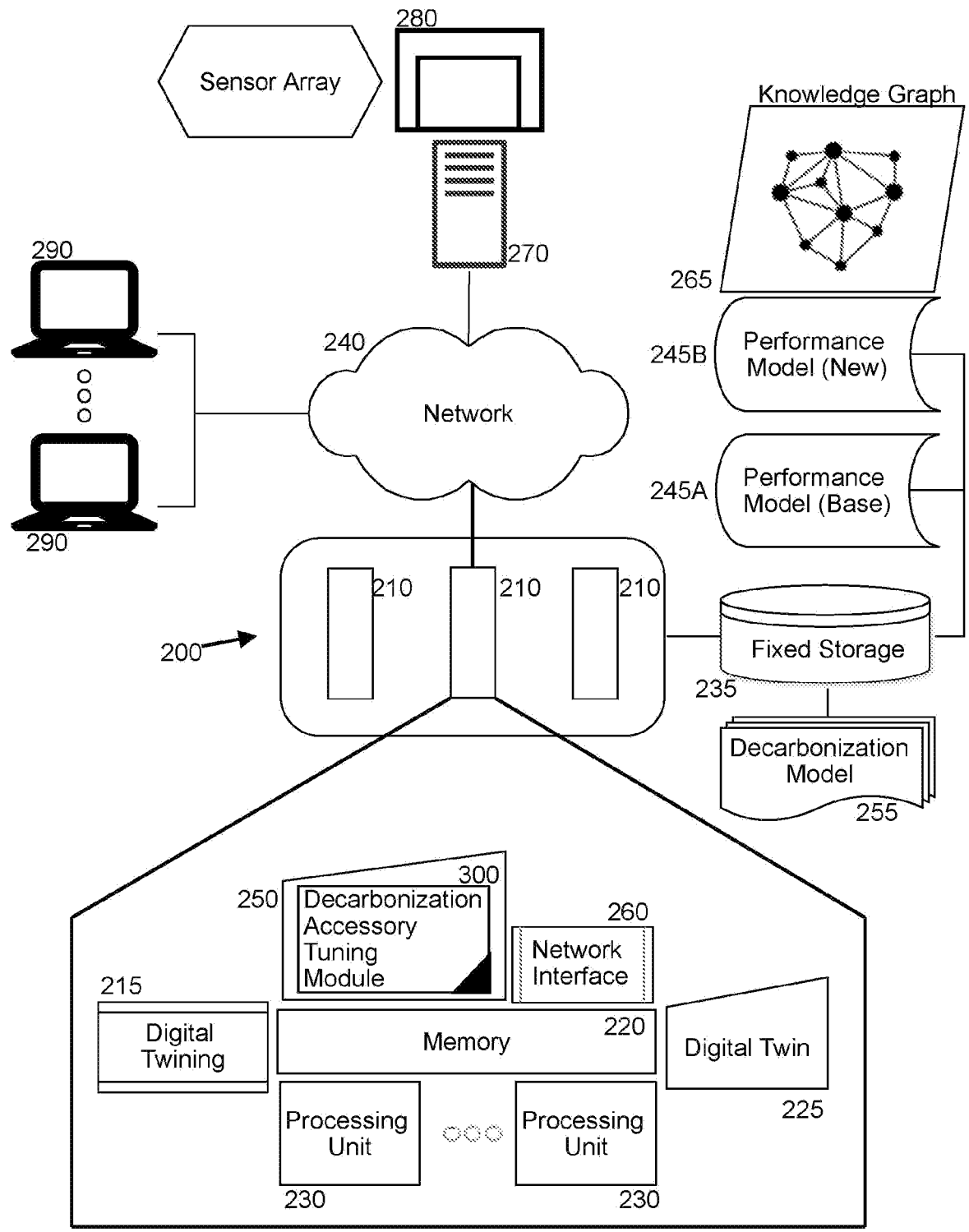
FIG. 2 is a block diagram depicting a data processing system adapted to perform one of the aspects of the process of FIG. 1; and, FIG. 3 is a flow chart illustrating one of the aspects of the process of FIG. 1.

Aspects of the process described in connection with FIG. 1 can be implemented within a data processing system. In further illustration, FIG. 2 schematically shows a data processing system adapted to tune a vessel control model to meet decarbonization goals. In the data processing system illustrated in FIG. 1, a host computing platform 200 is provided. The host computing platform 200 includes one or more computers 210, each with memory 220 and one or more processing units 230. The computers 210 of the host computing platform (only a single computer shown for the purpose of illustrative simplicity) can be co-located within one another and in communication with one another over a local area network, or over a data communications bus, or the computers can be remotely disposed from one another and in communication with one another through network interface 260 over a data communications network 240. The host computing platform 100 may be accessed from over the data communications network 240 by one or more client computers 290.

The host computing platform 200 is communicatively coupled over the data communications network 240 to a remote computing system 270 including control system 280 collecting data values from different sensors in a sensor array 265 in connection with a vessel (not shown). Those values include control inputs to the vessel (actual and environmental), performance metrics of the vessel and observed carbon emissions of the vessel. Of note, the remote computing system 270 can be onboard the vessel itself, or remote from the vessel and receiving remotely sensed data also from over the data communications network 240. As well, the sensors of the sensor array 265 can be fully disposed about the vessel, partially disposed about the vessel, or fully remote from the vessel. Examples of onboard sensors in the sensor array 265 include Internet of Things (IoT) enabled switches, valves, transducers, thermocouples, gyroscopes, accelerometers, gauges and the like. Examples of remote sensors include satellite imagery, meteorological data, global navigation satellite system (GNSS) data, telemetry data, and the like.

Importantly, digital twining logic 215 is disposed within the memory 220 of the host computing platform 200 which is operable to generate and manage a digital twin 225 of the vessel with performance metrics, observed carbon emissions and control inputs received from the remote computing system 270. With the digital twin 225, the digital twining logic 215 simulates the performance of the vessel through modifications to the control inputs so that prospective performance metrics can be captured in response to different hypothetical combinations of control inputs, both actual and environmental. As such, the digital twining logic 215 stores in fixed storage 235, a performance model 245A determined for the vessel based upon a particular combination of control inputs with the base performance model 245A encapsulating the hypothetical performance metrics of the vessel as shown in the digital twin 225, and also observed carbon emissions as shown in the digital twin 225.

Notably, a computing device 250 including a non-transitory computer readable storage medium can be included with the data processing system 200 and accessed by the processing units 230 of one or more of the computers 210. The computing device stores 250 thereon or retains therein a program module 300 that includes computer program instructions which when executed by one or more of the processing units 230, performs a programmatically executable process for tuning a vessel control model to meet decarbonization goals. Specifically, the program instructions during execution select a decarbonization model 255 in the fixed storage 235 for application to the digital twin 225. The program instructions augment the simulated vessel with the accessories of the selected decarbonization model 255 and produce a new integrated performance model 245B encapsulating the control inputs for the vessel as accessorized, the settings of the accessories of the selected decarbonization model 255 and the performance metrics produced in the digital twin 225 during simulation.

The program instructions then compare the performance metrics of the new integrated performance model 245B to a pre-stored set of threshold minimum performance values. To the extent that a given one of the performance metrics fails a corresponding one of the threshold minimum performance values, an accessory of the selected decarbonization model 255 determined to have impacted the given one of the performance metrics is selected for tuning. The program instructions then incrementally adjust a configuration parameter of the determined accessory along with repeated simulation of the digital twin 225 until the given one of the performance metrics is determined no longer to fail the corresponding one of the threshold minimum performance values.

Thereafter, the program instructions write the new integrated performance model 250B to the fixed storage 235, for instance within the data structure of a knowledge graph 265. In this regard, the high level structure of the knowledge graph indicates that at the lower layer sensors provide actual data to a hierarchy of performance control inputs integrated through causal links, which are primarily performance metrics, enabling attainment of CO2 target levels through optimized settings of decarbonization accessories and voyage operational and cargo parameters.

Figure 3:
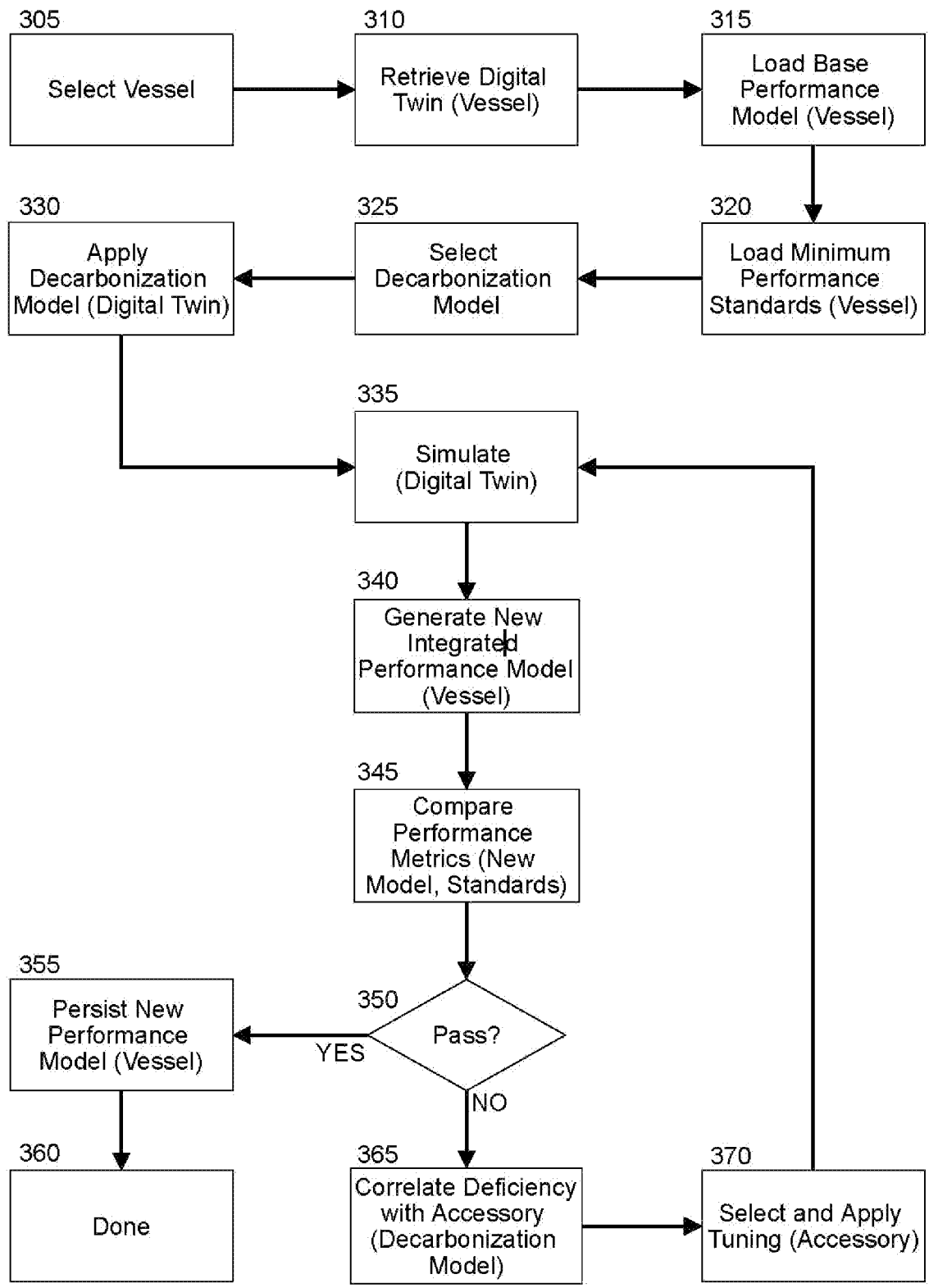

In further illustration of an exemplary operation of the module, FIG. 3 is a flow chart illustrating one of the aspects of the process of FIG. 1. Beginning in block 305, a vessel is selected and in block 310, a digital twin is loaded into the digital twining system one-to-one corresponding to the selected vessel. In block 315, a base performance model is retrieved for the vessel either explicitly based upon the identity of the vessel, or by inference based upon a similar type of vessel assigned to the existing performance model. In block 320, a set of minimum performance standards are loaded for the vessel or the type of the vessel and in block 325, a decarbonization model is selected for application to the loaded digital twin.

In block 330, the selected decarbonization model is applied to the digital twin by extending the model of the vessel to include the accessories encapsulated by the decarbonization model. Then, in block 335 the digital twin simulates the vessel as extended with the accessories of the decarbonization model. In block 340, a new integrated performance model is generated for the vessel including the performance metrics observed in the digital twin in consequence of the control inputs experienced by the vessel and including the accessories of the decarbonization model. As well, predicted carbon emissions from the vessel are included in the new integrated performance model. Thereafter, in block 345 the performance metrics of the new integrated performance model are compared to those of the loaded minimum performance standards.

In decision block 350, to the extent that a given one of the performance metrics fails a corresponding one of the minimum performance standards, in block 365 the given one of the performance metrics is correlated to a corresponding one of the accessories in the decarbonization model. Subsequently, in block 370 one or more of the configuration settings of the corresponding one of the accessories is adjusted prior to re-simulating in the digital twin 335. The process then repeats through block 340. In decision block 350, when the performance metrics of the new integrated performance model are determined to all pass the loaded minimum performance standards, in block 355 the new integrated performance model is persisted to storage in association with the vessel and the process ends in block 360.

Of import, the foregoing flowchart and block diagram referred to herein illustrate the architecture, functionality, and operation of possible implementations of systems, methods, and computing devices according to various embodiments of the present invention. In this regard, each block in the flowchart or block diagrams may represent a module, segment, or portion of instructions, which includes one or more executable instructions for implementing the specified logical function or functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

More specifically, the present invention may be embodied as a programmatically executable process. As well, the present invention may be embodied within a computing device upon which programmatic instructions are stored and from which the programmatic instructions are enabled to be loaded into memory of a data processing system and executed therefrom in order to perform the foregoing programmatically executable process. Even further, the present invention may be embodied within a data processing system adapted to load the programmatic instructions from a computing device and to then execute the programmatic instructions in order to perform the foregoing programmatically executable process.

To that end, the computing device is a non-transitory computer readable storage medium or media retaining therein or storing thereon computer readable program instructions. These instructions, when executed from memory by one or more processing units of a data processing system, cause the processing units to perform different programmatic processes exemplary of different aspects of the programmatically executable process. In this regard, the processing units each include an instruction execution device such as a central processing unit or "CPU" of a computer. One or more computers may be included within the data processing system. Of note, while the CPU can be a single core CPU, it will be understood that multiple CPU cores can operate within the CPU and in either instance, the instructions are directly loaded from memory into one or more of the cores of one or more of the CPUs for execution.

Aside from the direct loading of the instructions from memory for execution by one or more cores of a CPU or multiple CPUs, the computer readable program instructions described herein alternatively can be retrieved from over a computer communications network into the memory of a computer of the data processing system for execution therein. As well, only a portion of the program instructions may be retrieved into the memory from over the computer communications network, while other portions may be loaded from persistent storage of the computer. Even further, only a portion of the program instructions may execute by one or more processing cores of one or more CPUs of one of the computers of the data processing system, while other portions may cooperatively execute within a different computer of the data processing system that is either co-located with the computer or positioned remotely from the computer over the computer communications network with results of the computing by both computers shared therebetween.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for generating and tuning an integrated vessel performance control model to meet decarbonization goals comprising:
   loading from persistent storage into memory of a computing platform, an base performance model for a vessel, the base model observed performance metrics of the vessel corresponding to a specified set of control inputs for the vessel, and corresponding observed carbon emissions from the vessel responsive to the specified set of control inputs for the vessel;
   selecting a decarbonization model in the persistent storage, the decarbonization model correlating deployment into the vessel of a set of one or more accessories and a reduction in the carbon emissions resulting from use of the set of one or more accessories;
   computing a new integrated performance model for the vessel modeling new performance metrics resulting from the deployment of the one or more accessories and comparing the new performance metrics to a minimum standard of performance metrics for the vessel; and,
   on condition that one of the new performance metrics fails to meet the minimum standard of performance metrics, identifying a corresponding one of the accessories in the set impacting the one of the new performance metrics, incrementally applying an adjustment to the identified corresponding one of the accessories until the one of the new performance metrics is determined, to meet the minimum standard of performance metrics, simulating the new performance model in order to predict resulting carbon emissions and storing the resulting carbon emissions in the new performance model.

2. The method of claim 1, wherein the vessel comprises of two emission producing subsystems, the propulsion and the cargo management sub-system, and wherein the base performance model and the new integrated performance model each models the vessel propulsion and a cargo management system, as well as at least one carbon reduction performance enhancement device deployed on the vessel.

3. The method of claim 1, wherein the base performance model and the new performance model each encapsulate data reflective of performance metrics of a voyage of the vessel including route, speed, trim and draft responsive to environmental conditions imparted upon the vessel including wind, rain, current, and wave energy.

4. The method of claim 1, wherein the base and new performance models of the vessel including decarbonization accessories enable optimized ship energy production and distribution and attainment of emission targets and CII ratings.

5. The method of claim 1, wherein the base performance model is loaded based upon a common classification for the vessel including at least one of a vessel type of the vessel, a vessel geometry, a vessel propulsion system characterization and a vessel machinery configuration.

6. The method of claim 1, further comprising updating the base performance model with real time performance metrics received from over a computer communications network from different at sea vessels reporting real time values for the specified set of the control inputs, for the observed performance metrics and for the observed carbon emissions.

7. A data processing system adapted for tuning a vessel control model to meet decarbonization goals, the system comprising:
   a host computing platform comprising one or more computers, each with memory and one or processing units including one or more processing cores;
   network interface circuitry disposed in at least one of the computers and providing, to programmatic modules executing in the host computing platform, data communications services to other computing devices from over a data communications network;
   persistent storage coupled to the host computing platform storing therein both a set of decarbonization models, each correlating deployment into a vessel of a set of one or more accessories and a reduction in carbon emissions resulting from use of the set of one or more accessories, and also a base performance model for the vessel, a specified set of control inputs for the vessel, and observed ones of the carbon emissions from the vessel responsive to the specified set of control inputs for the vessel; and,
   a tuning module comprising computer program instructions enabled while executing in the memory of at least one of the processing units of the host computing platform to perform:
      loading the base performance model for the vessel from the persistent storage into the memory of the host computing platform and selecting one of the decarbonization models in the persistent storage;
      computing a new integrated performance model for the vessel modeling new performance metrics resulting from the deployment of the one or more accessories of the selected one of the decarbonization models, and comparing the new performance metrics to a minimum standard of performance metrics for the vessel; and,
      on condition that one of the new performance metrics fails to meet the minimum standard of performance metrics, identifying a corresponding one of the accessories in the set impacting the one of the new performance metrics, incrementally applying an adjustment to the identified corresponding one of the accessories until the one of the new performance metrics is determined to meet the minimum standard of performance metrics, simulating the new integrated performance model in order to predict resulting carbon emissions and storing the resulting carbon emissions in the new integrated performance model in the persistent storage.

8. The system of claim 7, wherein the observed performance metrics and the new performance metrics each include at least fuel consumption, a rate of emissions emitted over a set distance of travel and efficiency for hull, machinery and energy system elements of the vessel, operating atmospheric conditions and operating sea conditions.

9. The system of claim 7, wherein the specified set of the control inputs include at least vessel speed, draft and trim, load, main engine power and configuration and energy consumption.

10. The system of claim 7, wherein the base performance model is loaded based upon a common classification for the vessel including at least one of a vessel type of the vessel, a vessel geometry, vessel propulsion system characterization and vessel machinery configuration.

11. The system of claim 7, wherein the program instructions further perform updating the base performance model with real time performance metrics received from over a computer communications network from different at sea vessels reporting real time values for the specified set of the control inputs, for the observed performance metrics and for the observed carbon emissions.

12. A computing device comprising a non-transitory computer readable storage medium having program instructions stored therein, the instructions being executable by at least one processing core of a processing unit to cause the processing unit to tune a vessel control model to meet decarbonization goals by:
loading from persistent storage into memory of a computing platform, a base performance model for a vessel, the base performance model modeling observed performance metrics of the vessel corresponding to a specified set of control inputs for the vessel, and corresponding observed carbon emissions from the vessel responsive to the specified set of control inputs for the vessel;
selecting a decarbonization model in the persistent storage, the decarbonization model correlating deployment into the vessel of a set of one or more accessories and a reduction in the carbon emissions resulting from use of the set of one or more accessories;
computing a new integrated performance model for the vessel modeling new performance metrics resulting from the deployment of the one or more accessories and comparing the new performance metrics to a minimum standard of performance metrics for the vessel; and,
on condition that one of the new performance metrics fails to meet the minimum standard of performance metrics, identifying a corresponding one of the accessories in the set impacting the one of the new performance metrics, incrementally applying an adjustment to the identified corresponding one of the accessories until the one of the new performance metrics is determined to meet the minimum standard of performance metrics, simulating the new performance model in order to predict resulting carbon emissions and storing the resulting carbon emissions in the new integrated performance model.

13. The device of claim 12, wherein the observed performance metrics and the new performance metrics each include at least fuel consumption, a rate of emissions emitted over a set distance of travel and energy efficiency for hull, machinery and energy system elements of the vessel, operating atmospheric conditions and operating sea conditions.

14. The device of claim 12, wherein the specified set of the control inputs include at least vessel speed, draft and trim, load, main engine power and configuration and energy consumption.

15. The device of claim 12, wherein the base performance model is loaded based upon a common classification for the vessel including at least one of a vessel type of the vessel, a vessel geometry, vessel propulsion system characterization and vessel engine configuration.

16. The device of claim 12, wherein the instructions cause the processing unit to tune the vessel control model by additionally updating the base performance model with real time performance metrics received from over a computer communications network from different at sea vessels reporting real time values for the specified set of the control inputs, for the observed performance metrics and for the observed carbon emissions.

\* \* \* \* \*